J. T. FIFE.
Bee Hive.
No. 84,812.  Patented Dec. 8, 1868.
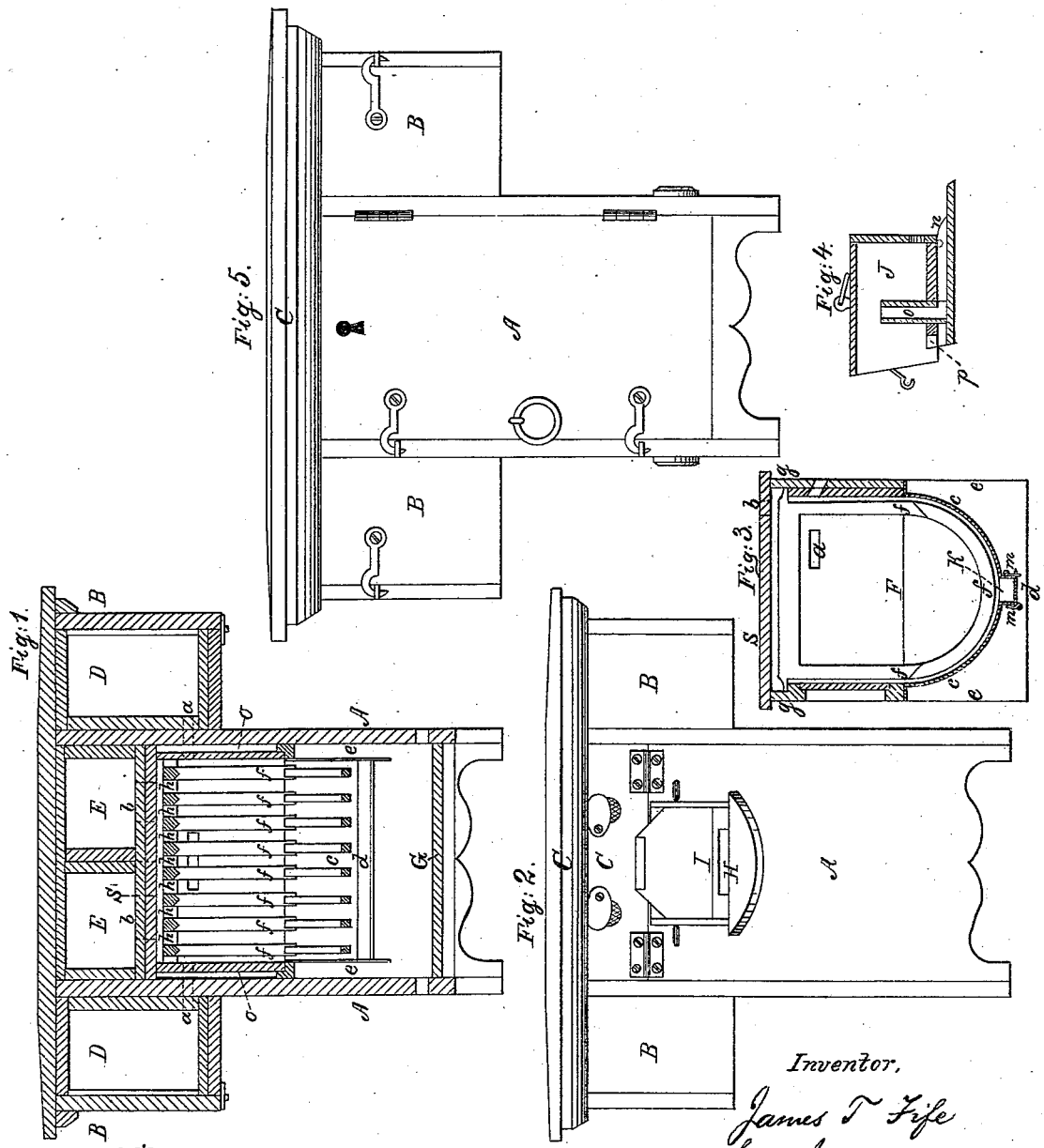

UNITED STATES PATENT OFFICE.

JAMES T. FIFE, OF TYNER CITY, INDIANA.

Letters Patent No. 84,812, dated December 8, 1868.

IMPROVEMENT IN BEE-HIVES.

The Schedule referred to in these Letters Patent and making part of the same.

*To all whom it may concern:*

Be it known that I, JAMES T. FIFE, of Tyner City, in the county of Marshall, and in the State of Indiana, have invented certain new and useful Improvements in Bee-Hives; and do hereby declare that the following is a full, clear, and exact description thereof, reference being had to the accompanying drawings, and to the letters of reference marked thereon.

In the annexed drawings, forming part of this specification—

Figure 1 is a vertical sectional view;
Figure 2, a front view;
Figure 3, a sectional view of the chamber;
Figure 4, a side sectional view of the robber or drone-catcher; and
Figure 5 represents a back view of the hive and its doors.

The nature of my invention consists in the general arrangement of the hive with wings or side-boxes, lid, and doors; and in the arrangement of the chamber, honey-boxes, drawers, robber-catcher, and ventilating-chambers.

To enable others skilled in the art to make and use my invention, I will proceed to describe its construction and operation.

The hive, A, is made of wood, of any required size, with two side-boxes B B, one on each side of the hive, at the top.

The lid C covers the whole hive, including the side-boxes or wings, and is so arranged, that, when shut and locked, it locks the door of the main hive, and also the doors of the side-boxes or wings B B. It includes not only that part which covers the hive, but also the side of the main part of the hive down to the top of the bee-entrance; this part of the side being rigidly fastened to the cover, and hinged to the lower part, as shown in fig. 2. It will be seen that on throwing back the cover, this part moves with it, and allows the honey-boxes on top of chamber to be slid out.

These side-boxes are attached to the main hive A permanently, and so arranged that the honey-boxes D D can be slipped into them, and closed in by shutting the doors, which are so fastened to the lower edge of the wings as to turn up and down on hinges, and are fastened by hooks. The honey-boxes D D, used for the end boxes, are ordinary wooden boxes, with glass on the side toward the door, the hole *a*, for the entrance of the bees, being near the bottom of the box, and about on a level with the main entrance.

On the main hive are two more honey-boxes, E E, made to fit the space between the lid C and the chamber F.

These two honey-boxes have glass ends, and entrance-holes C C in the bottom, at the front side, as near the main entrance as possible.

The chamber F in the main hive is made mostly of wood, with a tin or zinc bottom, *c*.

This bottom is a half circle, and at its lower point is a wire side-door, *d*, hung on hinges, and fastened in some convenient manner, and the door is so arranged, that, in hiving bees, the side of the door rests on the ground, and forms an inclined plane, on which the bees may easily enter the chamber F.

The tin or zinc flanges *e e*, on the side of the chamber, serve as feet when hiving, and prevent the bees from crawling away.

The frames *f f*, for the honey-comb in the chamber, are made to fit nearly the inside of the chamber, and are so arranged as to take out and put in at pleasure, being hung on shoulders *g g*, and each frame kept in its proper place by cleats, blocks, or pieces, *h h*, of wood.

The chamber is kept in proper position in the main box or hive by wooden ways, *i i*, on which it rests, and so arranged as to give room, between the outside of the chamber and the inside of the box, for an air-space, *o*, and room is also left between the chamber and the door for ventilation. This door, which may be made in any manner suitable, covers the back of the main hive, thus enclosing the chamber F and honey-boxes E E.

At the bottom of the half circle of the chamber F is an opening, *k*, extending the whole length of the bottom, and below the opening are sides *m m*, and on the bottom edge is hung the wire side-door *d*, above referred to.

In the bottom of the main box or hive is a false bottom, G, resting on cleats nailed to the front and rear sides of the hive, which can easily be taken out for the purpose of cleaning or ventilation.

The bee-entrance H, in the main hive, is near the top of the chamber, and a tin or metal slide, I, or its equivalent, is constructed so as to easily close the same.

Upon and over the entrance is a robber or drone-catcher, fig. 4, fastened to the main hive with hooks, so as to be easily taken off. The catcher consists of a box, J, of any required size, provided with a double bottom, and so constructed that the space between the bottoms forms an entrance, *n*, made to resemble the main entrance to the hive. After the bee gets into the entrance, it passes through a tube, *o*, which opens near the top of the box, and some distance from the side of the main hive. By closing the slide I to the main entrance, whatever may get inside the catcher is secured, and, by opening the main entrance, the bees get into the robber-box, and easily conquer the robbers. A small entrance, *p*, in the back of the robber-catcher, permits the bees in the hive to enter the robber-box.

Near the bottom of the main hive, on the sides, and over the main entrance, are holes for ventilation, which should be protected on the inside with wire gauze.

Having thus fully described my invention,

What I claim as new, and desire to secure by Letters Patent, is—

1. The lid C, when so arranged as to cover the main hive, A, as well as the side-boxes B B, and to lock the door to the main hive and the end doors to the wings, substantially as and for the purposes herein set forth.

2. The chamber F, constructed as described, and provided with the entrance k, for the bees to enter the chamber when hiving them, and with entrances a and b, for the passage of the bees from said chamber to the different honey-boxes, substantially as and for the purposes herein set forth.

3. The combination of the side-boxes B B, chamber F, honey-boxes D D and E E, ventilating-chamber o, frames f f, and robber-catcher J, to make and constitute a complete bee-hive, substantially as and for the purposes herein set forth.

4. The arrangement of the case A, and its wings B B, with the chamber F, honey-boxes E E and D D, and cover C, all constructed and combined in the manner specified.

In testimony that I claim the foregoing, I have hereunto set my hand, this 20th day of April, 1868.

JAMES T. FIFE.

Witnesses:
PETER SCHLARB,
J. P. HAWKINS.